United States Patent
Gan et al.

[11] Patent Number: 5,835,880
[45] Date of Patent: Nov. 10, 1998

[54] APPARATUS AND METHOD FOR VEHICLE FOLLOWING WITH DYNAMIC FEATURE RECOGNITION

[75] Inventors: Zhongxue Gan; Wei-Ping Wang, both of Storrs; Oing Tang, Wethersfield; Ruiming Zhang, Storrs, all of Conn.; John Moh, Freshmeadows, N.Y.

[73] Assignee: VI & T Group, Inc., Freshmeadows, N.Y.

[21] Appl. No.: 503,943

[22] Filed: Jul. 19, 1995

[51] Int. Cl.$^6$ .............................. G06K 9/00; G08G 1/017
[52] U.S. Cl. .......................... 701/205; 701/300; 701/301; 340/903; 382/154; 382/199
[58] Field of Search ..................................... 364/447, 460, 364/461, 462, 561; 340/903, 435, 937; 382/103, 104, 154, 199, 266, 283, 174; 356/3.14; 701/205, 300, 301, 302

[56] References Cited

U.S. PATENT DOCUMENTS

| | | | |
|---|---|---|---|
| 3,952,301 | 4/1976 | Sorkin | 343/7 |
| 4,361,202 | 11/1982 | Minovitch | 180/168 |
| 4,601,053 | 7/1986 | Grumet | 382/106 |
| 4,621,705 | 11/1986 | Etoh | 180/169 |
| 4,622,636 | 11/1986 | Tachibana | 364/424 |
| 4,628,317 | 12/1986 | Nishikawa et al. | 340/903 |
| 4,703,429 | 10/1987 | Sakata | 364/426 |
| 4,706,195 | 11/1987 | Yoshino et al. | 364/426 |
| 4,791,570 | 12/1988 | Sherman et al. | 364/436 |
| 4,855,822 | 8/1989 | Narendra et al. | 358/103 |
| 4,893,240 | 1/1990 | Karkouti | 364/424.05 |
| 4,931,937 | 6/1990 | Kakinami et al. | 364/460 |

(List continued on next page.)

OTHER PUBLICATIONS

Ozawa, "Image Sensors in Traffic and Vehicle Control", IEEE Aug.–Sep. 1994, pp. 27–34.

Schwarzinger et al, "Vision–Based Car–Following: Detection, Tracking, and Identification", IEEE Jun.–Jul. 1992, pp. 24–29.

Zielke et al., "Cartrack–Computer Vision–Based Car–Following", IEEE Nov.–Dec. 1992, pp. 156–163.

"Automatic Vehicle Control Developments in the Path Program", IEEE Transactions On Vehicular Technology, vol. 40, No. 1, Feb. 1991, pp. 114–129.

"Visual Control of an Autonomous Vehicle (BART)–The Vehicle–Following Problem", IEEE Transactions On Vehicular Technology, vol. 40, No. 3, Aug. 1991, pp. 654–662.

"Automated Highway Studies at the Ohio State University–An Overview", IEEE Transactions On Vehicular Technology, vol. 40, No. 1, Feb. 1991, pp. 100–113.

(List continued on next page.)

*Primary Examiner*—Tan Q. Nguyen
*Attorney, Agent, or Firm*—McCormick, Paulding & Huber

[57] ABSTRACT

In an apparatus and method for automatic vehicle following, a pair of video cameras are mounted on the front portion of a following vehicle, and each camera generates image data indicative of a respective image of a distinctive mark located on a rearward portion of a lead vehicle. An image processor generates two one-dimensional image-intensity distributions for each mark image based on the image data, and in turn generates a respective edge-intensity distribution based on each image-intensity distribution. The edge-intensity distributions are each generated by taking the first derivative of the respective image-intensity distribution. The image processor in turn generates a respective feature vector based on each edge-intensity distribution, wherein the vector components of each feature vector define select characteristics of the respective mark image. The center points of the two corresponding mark images are determined based on the feature vectors, and a signal processor generates signals indicative of the following distance and the heading angle of the lead vehicle based on the image center points. A window enclosing each mark image is moved upon generating a new mark image to the approximate center point of the preceding image, to substantially follow image movements from one camera image frame to the next, and thereby suppress noise and enhance the image-processing speed of the apparatus.

26 Claims, 4 Drawing Sheets

U.S. PATENT DOCUMENTS

| | | | |
|---|---|---|---|
| 4,962,457 | 10/1990 | Chen et al. | 364/443 |
| 5,039,217 | 8/1991 | Maekawa et al. | 356/1 |
| 5,053,964 | 10/1991 | Mister et al. | 364/424.01 |
| 5,053,979 | 10/1991 | Etoh | 364/565 |
| 5,058,024 | 10/1991 | Inselberg | 364/461 |
| 5,101,198 | 3/1992 | Abou et al. | 340/825.5 |
| 5,122,961 | 6/1992 | Toyama et al. | 364/449 |
| 5,124,923 | 6/1992 | Takahashi | 364/426.04 |
| 5,126,735 | 6/1992 | Trevijano | 340/902 |
| 5,159,480 | 10/1992 | Gordon et al. | 359/181 |
| 5,159,557 | 10/1992 | Ogawa | 364/460 |
| 5,173,859 | 12/1992 | Deering | 364/426.01 |
| 5,223,844 | 6/1993 | Mansell et al. | 342/357 |
| 5,234,071 | 8/1993 | Kajiwara | 180/169 |
| 5,285,523 | 2/1994 | Takahashi | 395/22 |
| 5,303,019 | 4/1994 | Irie | 356/3.14 |
| 5,331,561 | 7/1994 | Barret et al. | 364/447 |
| 5,337,236 | 8/1994 | Fogg et al. | 364/424.04 |
| 5,487,116 | 1/1996 | Nakano et al. | 382/154 |
| 5,515,448 | 5/1996 | Nishitani | 340/435 |
| 5,554,983 | 9/1996 | Kitamura et al. | 340/937 |

OTHER PUBLICATIONS

"An Overview of Systems Studies of Automated Highway Systems", IEEE Transactions On Vehicular Technology, vol. 40, No. 1, Feb. 1991, pp. 82–99.

"Smart Cars on Smart Roads: Problems of Control", IEEE Transactions on Automatic Control, vol. 38, No. 2, Feb. 1993, pp. 195–207.

APPARATUS AND METHOD FOR VEHICLE FOLLOWING WITH DYNAMIC FEATURE RECOGNITION

FIELD OF THE INVENTION

The present invention relates to apparatus and methods for vehicle following, and more particularly, to such apparatus and methods wherein the following vehicle measures the distance from the lead vehicle and the heading angle of the lead vehicle based on dynamic feature recognition in order to track and follow the lead vehicle at safe distances.

BACKGROUND INFORMATION

In certain prior systems for automatic vehicle following, the steering and speed of the following vehicle is controlled based on measurements of the heading angle of the lead vehicle, and the following distance from the lead vehicle. In vision-based control systems, the heading angle and following distance can be obtained by visually identifying a tracking feature or mark on the lead vehicle. Based on this measured information, appropriate steering and speed commands are generated to control the following vehicle to follow or track the lead vehicle at safe distances in order to avoid accidents and/or congestion.

One such video-based tracking technique developed by researchers at Texas A & M University employs stereo cameras installed on a front portion of the following vehicle in order to measure the following distance and heading angle of the lead vehicle. The lead vehicle includes a tracking feature or mark in the form of a relatively bright circular point to facilitate detection by the cameras of the following vehicle.

Another prior video-based tracking system employs three-dimensional data pertaining to the following vehicle's environment in order to detect road conditions, along with the position and orientation of the lead vehicle.

These and other vision-based systems are sensitive to environmental noise, particularly resulting from background or other features located adjacent to a mark or like tracking feature on the lead vehicle. As a result, it has proven to be difficult to recognize and distinguish the mark or like tracking feature from its environment, and in turn control the speed and steering of the following vehicle to automatically follow and accurately track the lead vehicle.

It is an object of the present invention to overcome the drawbacks and disadvantages of prior art vision-based vehicle following systems.

SUMMARY OF THE INVENTION

The present invention is directed to an apparatus and method for vehicle following, wherein a pair of video cameras are mounted on the front portion of a following vehicle, and each camera generates image data indicative of a respective image of a distinctive mark located on a rearward portion of a lead vehicle. An image processor generates at least one image-intensity distribution for each mark image based on the image data, and in turn generates a respective edge-intensity distribution based on each image-intensity distribution. The edge-intensity distributions are each preferably generated by taking the first derivative of the respective image-intensity distribution. The image processor in turn generates signals indicative of at least one characteristic feature of each mark image based on the respective edge-intensity distributions. In a preferred embodiment of the invention, the vector components of at least one feature vector define the characteristic features of each mark image.

Two common points, such as the center points of the two corresponding mark images, are then determined based on the feature vectors, and a signal processor generates signals indicative of the following distance and of the heading angle of the lead vehicle based on the image center points. A moving window enclosing each mark image is moved upon generating a new mark image to the approximate center point of the preceding image to substantially follow image movements from one camera image frame to the next, and thereby suppress noise and enhance the image-processing speed of the apparatus.

One advantage of the apparatus and method of the present invention, is that the image profiles compress the image data and thereby suppress noise, and the moving windows further suppress noise and increase the image-processing speed of the invention in order to permit the following vehicle to automatically follow and accurately track the lead vehicle at safe distances.

Other advantages of the present invention will become apparent in view of the following detailed description and accompanying drawings.

DETAILED DESCRIPTION OF A PREFERRED EMBODIMENT

Figure 1:
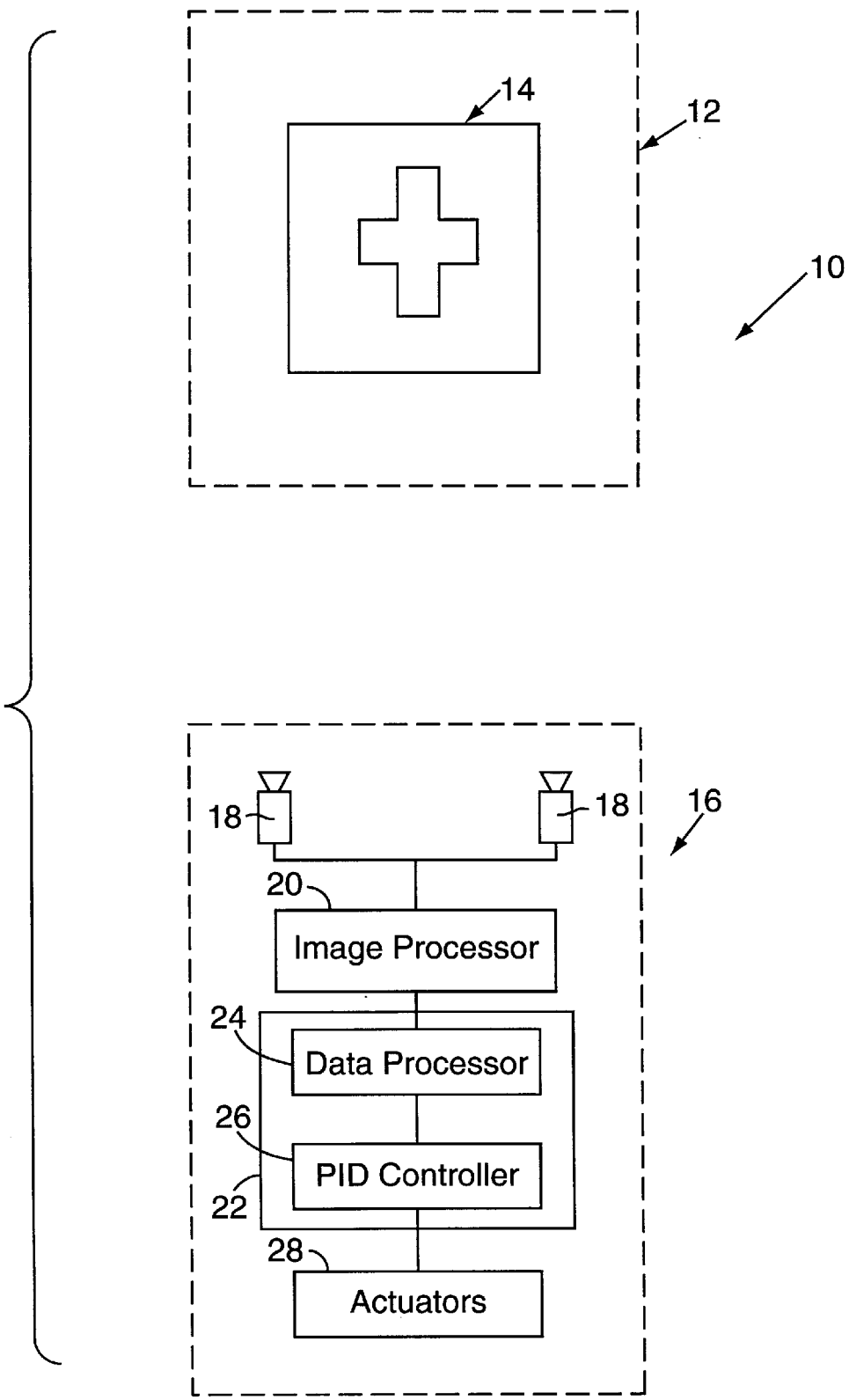
FIG. 1 is a schematic diagram of an apparatus embodying the present invention for vehicle following with dynamic feature recognition.
Figure 2:
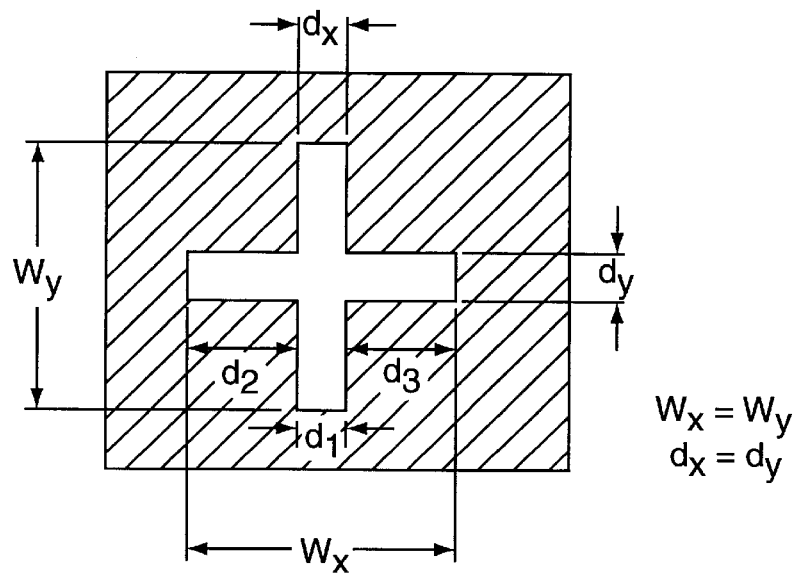
FIG. 2 is a more detailed, somewhat schematic illustration of a tracking feature or mark of the lead vehicle in the apparatus of FIG. 1.

In FIG. 1, an apparatus embodying the present invention is indicated generally by the reference numeral 10. A lead vehicle 12 includes a unique tracking feature or mark 14 of the apparatus, which is typically located on a rearward portion of the lead vehicle, such as on a rear fender or bumper. As shown in FIGS. 1 and 2, the mark 14 defines a distinctive geometric configuration, and in the embodiment of the present invention illustrated, it is a cross-like configuration. As will be recognized by those skilled in the art, however, other tracking features or marking configurations may be employed, so long as the mark is capable of optical recognition and can be distinguished from its background and/or other markings or features on the vehicle or in its environment. Accordingly, a name plate, license plate or similar feature typically found on vehicles may equally be employed as the mark 14. The mark 14 is preferably also defined by a reflective surface, such as a white surface, and the marking background should concomitantly be defined by a relatively dark, substantially non-reflective surface, such as a black surface.

As also shown in FIG. 1, a following vehicle 16 includes a pair of cameras 18 mounted on the front end of the vehicle for detecting the mark 14 of the lead vehicle and generating image data of the mark. The stereo cameras 18 are preferably commercial, video cameras of a type known to those of ordinary skill in the pertinent art. Each camera 18 is coupled to an image processor 20 for receiving and processing the image data from the cameras. In accordance with the dynamic feature recognition aspect of the present invention, the image processor 20 obtains (x, y) coordinate positions of the lead vehicle based on the relationship between the three-dimensional coordinates of the mark 14 on the back of the vehicle, and the corresponding coordinates of the left and right images from the cameras 18 representing the projection of the mark through the stereo-camera model.

The image processor 20 is in turn coupled to a digital signal processor (DSP) 22, which includes a data processor 24 for receiving the image data from the image processor, and based on such data, generating signals indicative of the following distance, heading angle of the lead vehicle, and other data as required based on the stereo-image data of the marking, as is described further below. The DSP 22 also includes an adaptive PID controller 26 coupled to the data processor 24 for generating speed and steering control signals for the following vehicle based on the data signals received from the data processor. The PID controller 26 is in turn coupled to one or more actuators mounted on the following vehicle for controlling the speed and steering of the following vehicle in order to follow at safe distances and accurately track the lead vehicle.

The DSP 22 and actuators 28 are of a type known to those of ordinary skill in the pertinent art, such as the type disclosed in co-pending patent application Ser. No. 08/245,865, entitled "AUTOMATIC VEHICLE FOLLOWING SYSTEM", filed May 19, 1994, and assigned to the Assignee of the present invention, which is hereby expressly incorporated by reference as part of the present disclosure.

In order to determine the distance between the two vehicles (i.e., the following distance), common points, preferably the center points, of the mark images generated by the two cameras 18 are determined. As shown in FIG. 2, the mark image is characterized in the x-coordinate direction by a dimension Wx, is characterized in the y-coordinate direction by a dimension Wy, and each bar of the mark is characterized by a width d in the x and y-coordinate directions.

Figure 3:
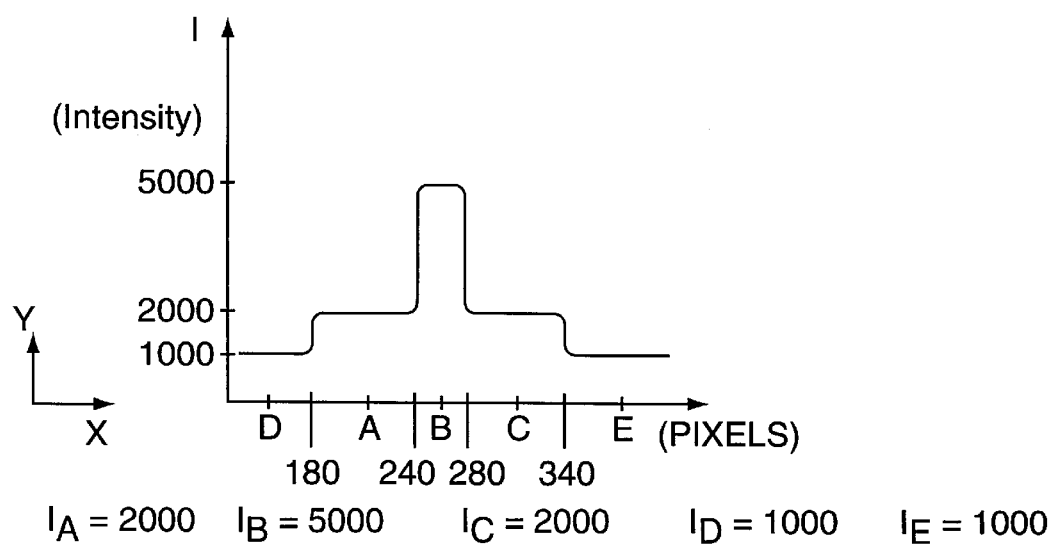
FIG. 3 is a graphical illustration of a typical image profile generated by the apparatus of FIG. 1 showing the image intensities (I) of a tracking feature or mark image in the x-coordinate direction of a respective image frame.

Accordingly, as shown typically in FIG. 3, the first image-processing step of the image processor is to compress the image data by taking a profile of each mark image in the x and y-coordinate directions in order to obtain two one-dimensional intensity distributions for each such image. A primary purpose of generating the image profiles is to eliminate noise and intensify the image signal, and thereby eliminate erroneous readings based on such noise. As shown in FIG. 3, the image profile in the x-coordinate direction is obtained by adding the intensity values of the image along the y-direction. The intensity values are in gray scale units, and each increment in the x-coordinate direction corresponds to a respective pixel of the camera image frame. In the example of FIG. 3, at location A (which corresponds to pixel 210) the image intensity of the profile is 2000 ($I_A$= 2000), whereas at location B (pixel 260) the image intensity of the profile is 5000 ($I_B$=5000). Although not shown, the image processor generates a similar image profile in the y-coordinate direction in order to characterize the mark image in both x and y-coordinate directions.

As reflected in FIG. 3, the image processor also performs a smoothing operation on each image profile in order to further suppress noise. Preferably, the smoothing operation is performed by determining the average values of discrete groups of data points along the image profile, and generating the profiles based on the average values. For example, for every three data points, the average value of the three points is determined and used to create the image profile, as shown typically in FIG. 3. This tends to create a more smooth, clearly defined line for each profile.

Figure 4:
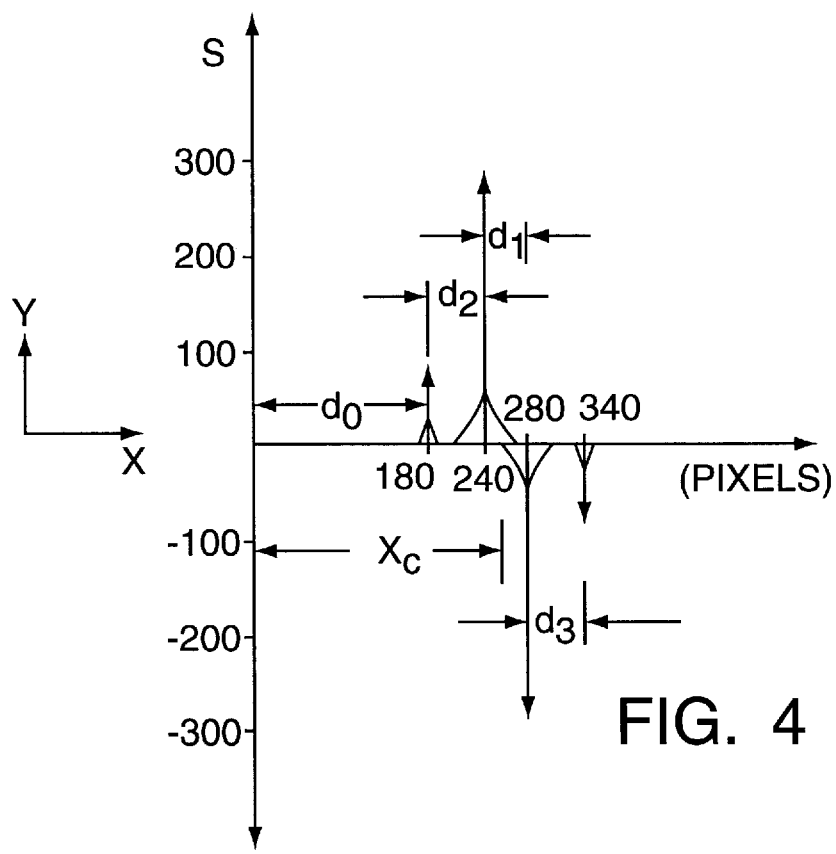
FIG. 4 is a graphical illustration of a typical edge-intensity distribution generated by the apparatus of FIG. 1 by taking the derivative of the image profile of FIG. 3 to further define the characteristic features of the tracking feature or mark.

With reference to FIG. 4, the next step performed by the image processor is edge detection, wherein a differentiation operation is performed on each image profile (shown typically in PIG. 3) to obtain an enhanced edge-intensity distribution and thereby further extract the features of the mark 14. Accordingly, the first derivative of each image profile is generated, preferably by subtracting the intensity value at each pixel from that of an adjacent pixel in the respective coordinate direction. This in turn generates a plurality of slope values S as follows:

$Sx=I(x)-I(x-1)$; and $Sy=I(y)-I(y-1)$;

wherein Sx defines the slope values for the x-coordinate direction image profiles, and Sy defines the slope values for the y-coordinate direction image profiles.

Because the slope of each image profile is substantially zero except at the profile edges (as shown, typically in FIG. 3), the edge-detection step generates a series of spikes, as shown typically in FIG. 4 for the x-coordinate direction, wherein each spike corresponds to a respective edge of the image profile. In the example of FIG. 4, the edge-detection profile generates the following characteristic features of the respective mark image in the x-coordinate direction:

Smax=3000;

Smin=−3000;

$d1=280-240=40$;

$d2=240-180=60$; and $d3=340-280=60$;

wherein Smax is the maximum slope of the respective image profile and corresponds to the maximum image intensity (Imax); Smin is the minimum slope of the respective image profile; d1 is the width of the center bar of the mark 14 in the x-coordinate direction, as shown in FIG. 2, and is also the distance between Smax and Smin, as shown in FIG. 4; d2 is the width of the left-side portion of the mark 14, as shown in FIG. 2, and is also the distance between Smax and the left-side edge of the mark, as shown in FIG. 4; and d3 is the width of the right-side portion of the mark 14, as shown in FIG. 2, and is also the distance between Smin and the right-side edge of the mark, as shown in FIG. 4. The sum of d1, d2 and d3 is equal to Wx, which as described above, defines the overall width of the mark 14 in the x-coordinate direction. These characteristics define a respective x-coordinate Feature Vector Fx[Smax, Smin, d1, d2, d3] defining the respective mark image in the x-coordinate direction.

Although not shown, an edge-detection profile of the respective mark image is also generated for the y-coordinate direction, and the same characteristic features are generated to define the mark 14 in the y-coordinate direction. Accordingly, a y-coordinate Feature Vector Fy[Smax, Smin, d1, d2, d3] defining the respective mark image in the y-coordinate direction is also determined for each mark image.

The next image-processing step is feature extraction and classification, wherein each Feature Vector (Fx, Fy) is compared to a corresponding standard Feature Vector (Fsx, Fsy) to determine if the mark image corresponds to a respective standard mark, and thus ensure that the cameras 18 are imaging the mark 14 of the lead vehicle and not an unknown feature. If the differences between the measured Feature Vectors and the corresponding standard Feature Vectors are less than a threshold vector quantity, the Vectors match and it is clear that the cameras 18 are imaging the mark 14. If, on the other hand, the Feature Vectors do not match, then the above-described imaging and data processing steps are repeated until the matching mark image is found.

With reference to the example of FIG. 4, the x-coordinate Feature Vector is defined as Fx=[Smax, Smin, d1, d2, d3]=[3000, −3000, 40, 60, 60]. In this example, the x-coordinate standard Feature Vector is defined as Fsx=[2800, −2700, 38, 58, 59]. As will be recognized by those skilled in the art, this standard Feature Vector is only exemplary, and other standard Feature Vectors will be selected for each system based on empirical test results in a manner known to those of ordinary skill in the art. Accordingly, based on the measured Feature Vector and the standard Feature Vector, the feature extraction and classification step may be performed as follows:

$$|Fx - Fsx| = |3000 - 2800| + |-3000 + 2700| + |40 - 38|(X) + |60 - 58|(X) + |60 - 59|(X) = 200 + 300 + 200 + 200 + 100 = 1000$$

Each of the sums involving d1, d2 and d3 is multiplied in accordance with a weighted component X, wherein in the exemplary embodiment X=1000, when X=1000, because of the differences in units between these characteristic features and the others.

In the exemplary embodiment, the threshold vector quantity is 1200, and therefore because the difference between the measured x-coordinate Feature Vector and standard Feature Vector is less than 1200 (1Fx−Fsx1=1000), the mark image corresponds to the mark 14 confirming that the cameras are imaging the correct feature on the lead vehicle. The threshold vector quantity is also selected based on the accuracy of the hardware and software employed to construct each particular apparatus, and is therefore based on empirical test results for each particular system in a manner known to those of ordinary skill in the art.

Once it is confirmed that the cameras are imaging the mark 14, the next image-processing step is to find the center point (or other common point) for the mark image generated by each camera. Each center point is defined by x and y coordinates, such that the first image center point is defined by coordinates (x1, y1) and the second image center point is defined by coordinates (x2, y2). In the exemplary embodiment of FIG. 4, the x-coordinate of the center point (x1) is defined as: x1=[position of Smax+position of Smin]/2= [240+280]/2=260, which corresponds to pixel 260 in the x-coordinate direction of the respective image frame. The y-coordinate of the first image center point (y1) is determined in the same manner, and in the exemplary embodiment is equal to 200, which corresponds to pixel 200 in the y-coordinate direction of the respective image frame.

For purposes of illustration, the second image center point (x2, y2), which is determined in the same manner as the first image center point (x1, y1) but for the second image frame, is defined by the x and y-coordinates (40, 200), wherein x2 corresponds to pixel 40 in the x-coordinate direction, and y2 corresponds to pixel 200 in the y-coordinate direction of the respective image frame.

Figure 5:
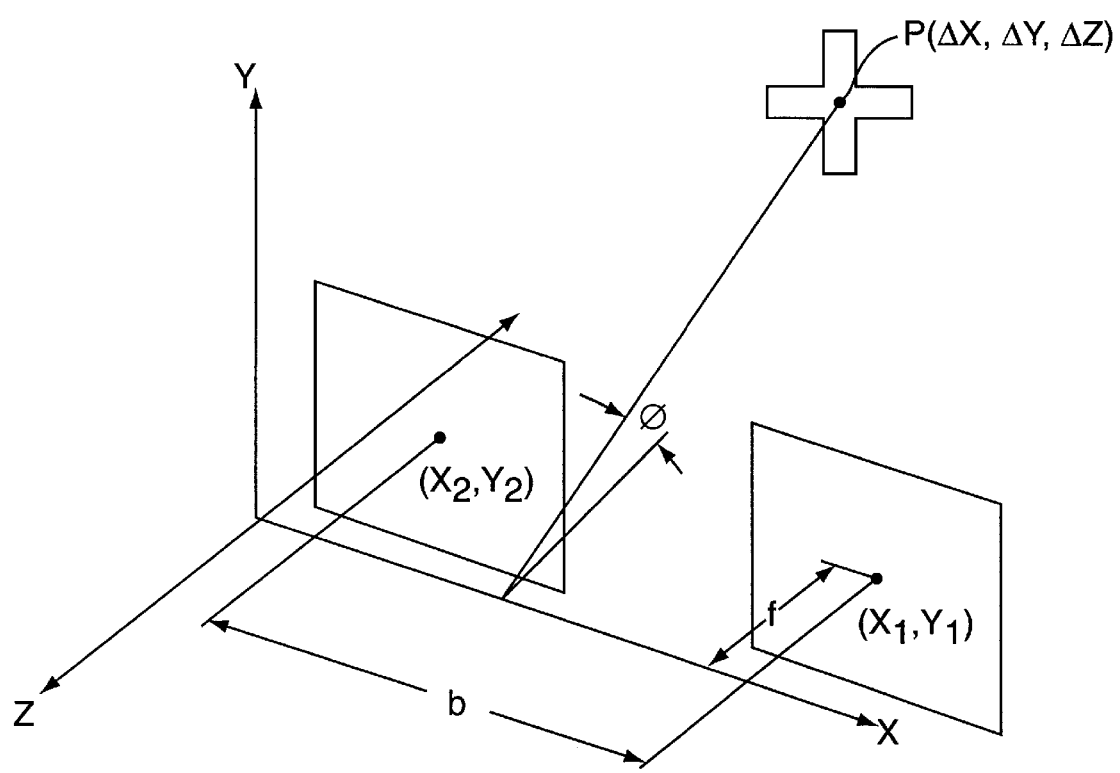
FIG. 5 is a schematic illustration showing the relative positions of the cameras of FIG. 1 and the detection of a tracking point $P(\Delta x, \Delta y, \Delta z)$ of the lead vehicle in order to determine the following distance and heading angle of the lead vehicle.

With reference to FIG. 5, once the center points (or other common points) for each mark image are determined, the following distance and heading angle of the lead vehicle are determined based on the change in position of a tracking point P defined as P(Δx, Δy, Δz), wherein:

$$\Delta x=[b/2]\times[(x1+x2)/(x1-x2)];$$

$$\Delta y=[b\times f]\times(x1-x2);$$

$$\Delta z=[b/2]\times[(y1+y2)/(x1-x2)];$$

b is the linear distance between the cameras 18; and f is the focal length of each camera 18, as shown schematically in FIG. 5.

In the exemplary embodiment, b=0.92 m, and f=0.0085 m. Although in the embodiment of the present invention illustrated the focal length f is fixed, cameras with variable focal lengths may equally be employed. Accordingly, in the exemplary embodiment:

$$\Delta x=(0.92/2)\times[(260-40)/(260+40)]=0.34 \ m$$

$$\Delta y=(0.92\times0.0085)/[(260+40)\times0.00001]=0.26 \ m$$

$$\Delta z=(0.92/2)\times[(200+200)/(260+40)]=0.6 \ m$$

The following distance d and heading angle φ are then each defined, and in turn determined as follows:

$$d=[\Delta x^2+\Delta y^2+\Delta z^2]^{1/2}=[0.34^2+0.26^2+0.6^2]^{1/2}=0.76 \ m$$

$$\phi=\tan^{-1}(\Delta y/\Delta x)=\tan^{-1}(0.26/0.34)=36°$$

Then, based on the following distance d and heading angle φ, the longitudinal and lateral speed of the lead vehicle are determined by the DSP 22 in a manner known to those of ordinary skill in the art. As described above, the adaptive PID algorithm of the DSP 22 is responsive to the following distance and heading angle data to control the speed and direction of the following vehicle so as to accurately track and follow the lead vehicle at safe distances in order to prevent collisions between the two vehicles in a manner known to those of ordinary skill in the pertinent art.

Figure 6:
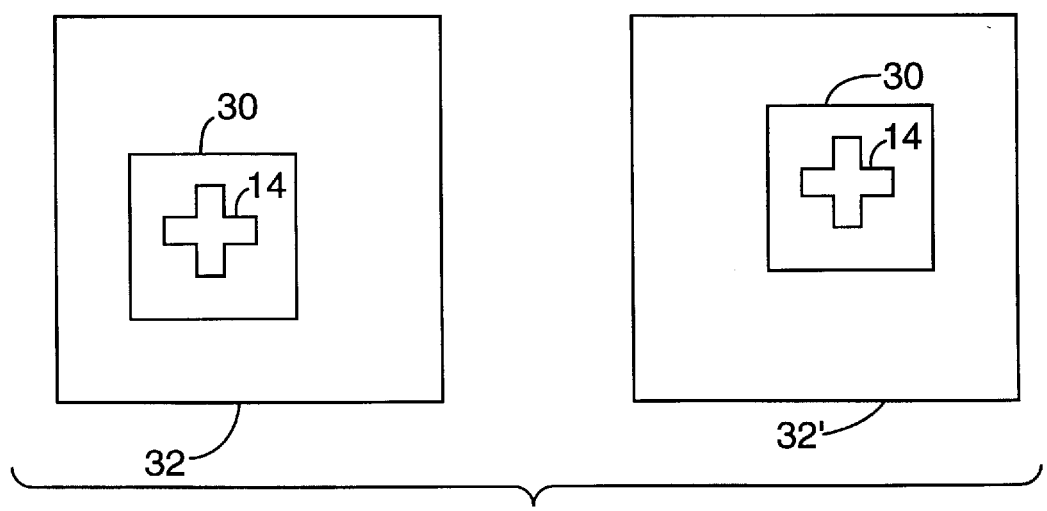
FIG. 6 is schematic illustration showing first and second image frames generated by a camera of the apparatus of FIG. 1, and the moving window generated by the apparatus for tracking the mark of the lead vehicle.

In accordance with a further aspect of the present invention, a moving window is employed with each camera 18 to facilitate tracking the mark 14. With reference to FIG. 6, each image of the mark 14 is analyzed by the image processor 20 through a moving window 30 which is less than the overall size of each camera image frame 32. Accordingly, because only a portion of each image frame 32 is analyzed and processed by the image processor 20, a substantial amount of background noise is eliminated thereby enhancing the accuracy and speed of the image processing steps as described above.

As shown typically in FIG. 6, the window 30 moves from one image frame 32 to the next 32' so as to substantially track the respective camera images of the mark 14. In the preferred embodiment of the present invention, upon analyzing each image frame, the image processor moves the center point of the window 30 to the center point (x1, y1) or (x2, y2) of the last mark image so that the window effectively follows movement of the mark. Each camera 18 typically operates at approximately 30 frames/second, and therefore each window 30 may likewise move up to 30 times per second so as to closely track the mark. The window size is selected so that it is sufficiently larger than the respective mark image in order to ensure that the window surrounds or encloses the mark image to thereby permit complete image analysis, as described above. As will be recognized by those skilled in the pertinent art, although the moving window 30 is shown in rectangular form, it may equally be formed in numerous other shapes so as to better conform, if necessary, to the shape of a particular mark.

One advantage of the present invention, is that the image profiles compress and eliminate background noise, and the moving window further eliminates such noise, which in turn permits faster operating speeds and leads to greater accuracy in measuring the following distance and heading angle of the lead vehicle so as to accurately track and follow the lead vehicle at safe distances.

As will be recognized by those skilled in the pertinent art, numerous modifications may be made to the above-described and other embodiments of the present invention without departing from the scope of the invention as defined in the appended claims. Accordingly, the detailed description of the preferred embodiment herein is intended to be taken in an illustrative as opposed to a limiting sense.

What is claimed is:

1. An apparatus for controlling a following vehicle to substantially follow the path of a lead moving object, comprising:

a distinctive mark on the lead moving object;

first means for generating image data indicative of two corresponding images of the mark on the lead moving object;

second means for generating at least one image profile for each mark image based on average values for a plurality of groups of image data points to further suppress noise in the image profiles;

third means for generating at least one characteristic feature of each mark image selected from the group including: (i) the maximum slope of the respective image profile, (ii) the minimum slope of the respective image profile, and (iii) at least one dimension defining the distance between two edges of the respective image profile; and fourth means for generating signals indicative of at least one of (i) the approximate distance between the lead moving object and the following vehicle and (ii) the heading angle of the lead moving object based on the characteristic features of the at least two image profiles.

2. An apparatus as defined in claim 1, wherein each image profile is comprised of at least one image-intensity profile generated by compressing the image data to eliminate noise and intensify the image signals.

3. An apparatus as defined in claim 2, wherein the image-intensity profiles are generated by compressing the image data for each mark image in first and second coordinate directions and in turn generating two one-dimensional intensity distributions for each mark image.

4. An apparatus as defined in claim 3, wherein each one-dimensional intensity distribution is generated by summing intensity values of the image in the respective coordinate direction.

5. An apparatus as defined in claim 1, wherein the third means for generating at least one characteristic feature of each mark image generates a respective edge-intensity distribution based on each image profile.

6. An apparatus as defined in claim 5, wherein the third means for generating at least one characteristic feature generates at least one feature vector based on characteristics of the respective edge-intensity distribution.

7. An apparatus as defined in claim 6, wherein the at least one feature vector has vector components based on the at least one of (i) the maximum slope of the respective image profile, (ii) the minimum slope of the respective image profile, and (iii) at least one dimension defining the distance between two edges of the respective image profile.

8. An apparatus as defined in claim 6, wherein the third means for generating at least one characteristic feature compares each feature vector to a corresponding predetermined feature vector to determine if the respective mark image substantially matches the leading object's mark.

9. An apparatus as defined in claim 1, wherein the fourth means generates signals indicative of common points in the two corresponding mark images based on the characteristic features.

10. An apparatus as defined in claim 9, wherein the common points are each approximately the center point of the respective mark image.

11. An apparatus as defined in claim 9, wherein the fourth means generates signals indicative of (i) the distance between the leading object and the following vehicle and (ii) the heading angle of the leading object, based on the coordinate positions of the common points in the two corresponding mark images.

12. An apparatus as defined in claim 1, further comprising means for generating a moving window enclosing each mark image within a respective image frame.

13. An apparatus as defined in claim 12, wherein each window is moved upon generating a new mark image to the approximate center point of the preceding image to substantially follow image movements.

14. An apparatus as defined in claim 1, wherein the distinctive mark is defined by a geometric configuration formed by a reflective surface and substantially surrounded by a substantially non-reflective surface.

15. An apparatus as defined in claim 1, wherein the lead moving object is a vehicle.

16. A method for controlling a following vehicle to substantially follow the path of a lead moving object, comprising the steps of:

generating image data indicative of two corresponding images of a distinctive mark on the lead moving object;

generating at least one image profile for each mark image based on average values for a plurality of groups of image data points to further suppress noise in the image profiles;

generating at least one characteristic feature of each mark image selected from the group including (i) the maximum slope of the respective image profile, (ii) the minimum slope of the respective image profile, and (iii) at least one dimension defining the distance between two edges of the respective image profile; and generating signals indicative of at least one of (i) the approximate distance between the lead moving object and the following vehicle and (ii) the heading angle of the lead moving object based on the characteristic features of the at least two image profiles.

17. A method as defined in claim 16, wherein the step of generating at least one image profile includes generating at least one image-intensity profile by compressing the image data to eliminate noise and intensify the image signals.

18. A method as defined in claim 17, wherein the step of generating at least one image profile further includes compressing the image data for each mark image in first and second coordinate directions and in turn generating two one-dimensional intensity distributions for each mark image.

19. A method as defined in claim 18, further comprising the step of generating each one-dimensional intensity distribution by summing intensity values of the image in the respective coordinate direction.

20. A method as defined in claim 16, further comprising the step of generating the at least one characteristic feature by generating a respective edge-intensity distribution based on each image profile.

21. A method as defined in claim 20, further comprising the step of generating at least one feature vector based on characteristics of each edge-intensity distribution.

22. A method as defined in claim 21, wherein the at least one feature vector has vector components based on the at least one of (i) the maximum slope of the respective image profile, (ii) the minimum slope of the respective image profile, and (iii) at least one dimension defining the distance between two edges of the respective image profile.

23. A method as defined in claim 21, further comprising the step of comparing each feature vector to a corresponding predetermined feature vector to determine if the respective mark image substantially matches the leading object's mark.

24. A method as defined in claim 16, further comprising the steps of generating signals indicative of common points in the two corresponding mark images based on the characteristic features, and generating signals indicative of (i) the distance between the leading object and the following vehicle and (ii) the heading angle of the leading object, based on the coordinate positions of the common points in the two corresponding mark images.

25. A method as defined in claim 24, further comprising the step of generating a moving window enclosing each mark image within a respective image frame.

26. A method as defined in claim 16, wherein the lead moving object is a vehicle.

* * * * *

UNITED STATES PATENT AND TRADEMARK OFFICE
CERTIFICATE OF CORRECTION

PATENT NO. : 5,835,880
DATED : Nov. 10, 1998
INVENTOR(S) : Zhongxue Gan, et al

It is certified that error appears in the above-identified patent and that said Letters Patent is hereby corrected as shown below:

On title page, item [75] "Oing Tang" should read --Qing Tang--

Signed and Sealed this

Second Day of March, 1999

Attest:

Q. TODD DICKINSON

*Attesting Officer*   Acting Commissioner of Patents and Trademarks